United States Patent
Calciu et al.

(10) Patent No.: US 11,947,458 B2
(45) Date of Patent: Apr. 2, 2024

(54) USING CACHE COHERENT FPGAS TO TRACK DIRTY CACHE LINES

(71) Applicant: VMware LLC, Palo Alto, CA (US)

(72) Inventors: Irina Calciu, Palo Alto, CA (US);
Jayneel Gandhi, Sunnyvale, CA (US);
Aasheesh Kolli, Palo Alto, CA (US);
Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/048,180

(22) Filed: Jul. 27, 2018

(65) Prior Publication Data
US 2020/0034297 A1   Jan. 30, 2020

(51) Int. Cl.
*G06F 12/0817*   (2016.01)
(52) U.S. Cl.
CPC .... *G06F 12/0828* (2013.01); *G06F 2212/152* (2013.01)
(58) Field of Classification Search
CPC .................................................. G06F 12/0828
See application file for complete search history.

(56) References Cited

U.S. PATENT DOCUMENTS

| | | | | |
|---|---|---|---|---|
| 161,898 A | * | 4/1875 | Purcell | B43M 11/00 118/253 |
| 1,162,475 A | * | 11/1915 | Gibson | G01F 1/28 235/61 J |
| 4,669,043 A | * | 5/1987 | Kaplinsky | G06F 12/1063 711/108 |
| 5,764,934 A | * | 6/1998 | Fisch | G06F 13/4027 710/113 |
| 6,275,907 B1 | * | 8/2001 | Baumgartner | G06F 9/3004 711/119 |
| 6,349,370 B1 | * | 2/2002 | Imamura | G06F 12/08 711/149 |
| 7,415,575 B1 | | 8/2008 | Tong et al. | |
| 8,413,145 B2 | | 4/2013 | Chou et al. | |
| 9,058,272 B1 | | 6/2015 | O'Bleness et al. | |
| 9,355,035 B2 | | 5/2016 | Goodman et al. | |
| 11,099,871 B2 | * | 8/2021 | Calciu | G06F 9/45558 |
| 2005/0240745 A1 | | 10/2005 | Iyer et al. | |
| 2005/0273571 A1 | | 12/2005 | Lyon et al. | |
| 2006/0059317 A1 | | 3/2006 | Kakeda | |

(Continued)

FOREIGN PATENT DOCUMENTS

KR   20180092273 A   8/2019

OTHER PUBLICATIONS

Yang, Hsin-jung et al., Leap Shared Memories: Automating the Construction of FPGA Coherent Memories, 2014, IEEE, pp. 117-124.

*Primary Examiner* — Ramon A. Mercado
(74) *Attorney, Agent, or Firm* — King Intellectual Asset Management (57) ABSTRACT

A device is connected via a coherence interconnect to a CPU with a cache. The device monitors cache coherence events via the coherence interconnect, where the cache coherence events relate to the cache of the CPU. The device also includes a buffer that can contain representations, such as addresses, of cache lines. If a coherence event occurs on the coherence interconnect indicating that a cache line in the CPU's cache is dirty, then the device is configured to add an entry to the buffer to record the dirty cache line.

17 Claims, 4 Drawing Sheets

(56) References Cited

U.S. PATENT DOCUMENTS

| | | | |
|---|---|---|---|
| 2007/0180197 A1 | 8/2007 | Wright et al. | |
| 2008/0086600 A1 | 4/2008 | Qiao | |
| 2008/0127182 A1 | 5/2008 | Newport et al. | |
| 2008/0209127 A1 | 8/2008 | Brokenshire et al. | |
| 2009/0300289 A1 | 12/2009 | Kurts et al. | |
| 2010/0274987 A1* | 10/2010 | Subrahmanyam | G06F 12/1036 711/207 |
| 2010/0313201 A1 | 12/2010 | Warton et al. | |
| 2011/0093646 A1 | 4/2011 | Koka et al. | |
| 2011/0137861 A1 | 6/2011 | Burnett et al. | |
| 2011/0252200 A1* | 10/2011 | Hendry | G06F 12/0831 711/147 |
| 2013/0246690 A1* | 9/2013 | Haneda | G06F 12/0804 711/143 |
| 2014/0108854 A1 | 4/2014 | Antony et al. | |
| 2014/0201460 A1 | 7/2014 | Blaner et al. | |
| 2015/0052309 A1* | 2/2015 | Philip | G06F 12/082 711/128 |
| 2015/0095576 A1* | 4/2015 | Subrahmanyam | G06F 12/0842 711/119 |
| 2015/0095585 A1* | 4/2015 | Subrahmanyam | G06F 11/1666 711/135 |
| 2015/0212845 A1 | 7/2015 | Tsirkin | |
| 2016/0253197 A1 | 9/2016 | Bonzini et al. | |
| 2016/0321181 A1* | 11/2016 | Kaxiras | G06F 12/0815 |
| 2017/0031825 A1 | 2/2017 | Chen et al. | |
| 2017/0185773 A1* | 6/2017 | Lemay | H04L 63/145 |
| 2017/0192886 A1* | 7/2017 | Boehm | G06F 12/0815 |
| 2018/0189087 A1 | 7/2018 | Palermo et al. | |
| 2018/0239707 A1 | 8/2018 | Tsirkin | |
| 2018/0373553 A1 | 12/2018 | Connor et al. | |
| 2018/0373561 A1 | 12/2018 | Nassi et al. | |
| 2019/0179750 A1 | 6/2019 | Moyer et al. | |
| 2019/0207714 A1 | 7/2019 | Loewenstein et al. | |
| 2019/0266101 A1 | 8/2019 | Robinson et al. | |
| 2019/0278713 A1 | 9/2019 | Gandhi et al. | |
| 2020/0034175 A1 | 1/2020 | Calciu et al. | |
| 2020/0034176 A1 | 1/2020 | Calciu et al. | |
| 2020/0034200 A1 | 1/2020 | Calciu et al. | |
| 2020/0034294 A1 | 1/2020 | Calciu et al. | |
| 2020/0034297 A1 | 1/2020 | Calciu et al. | |
| 2020/0125384 A1 | 4/2020 | Serebrin et al. | |
| 2020/0285580 A1 | 9/2020 | Subramanian et al. | |

* cited by examiner

USING CACHE COHERENT FPGAS TO TRACK DIRTY CACHE LINES

CROSS-REFERENCE TO RELATED APPLICATIONS

This application is related to:
U.S. application Ser. No. 16/048,182, filed on Jul. 27, 2018 (issued as U.S. Pat. No. 11,099,871),
U.S. application Ser. No. 16/048,178, filed on Jul. 27, 2018 (issued as U.S. Pat. No. 11,126,464),
U.S. application Ser. No. 16/048,183, filed on Jul. 27, 2018 (issued as U.S. Pat. No. 11,231,949), and
U.S. application Ser. No. 16/048,186, filed on Jul. 27, 2018 (issued as U.S. Pat. No. 10,761,984).

BACKGROUND

In many applications running in a computing system, including a virtualized system, modified data in memory is tracked at the page level using page tables. For example, if a small data item, such as a cache line is modified, then the entire page is declared to be dirty and this fact is recorded in a page table entry in the page tables for the application because the page is the smallest item in the system that can be tracked. Eventually, the entire page must be written back to persistent storage. This is inefficient, especially when only a small part of the page is modified.

SUMMARY

One or more embodiments includes a method for tracking dirty cache lines. The method includes monitoring cache coherence events on a coherence interconnect that is connected to processing hardware, such as a CPU, which includes a cache and adding a representation, such as an address, of a cache line to a buffer when a monitored coherence event indicates that the cache line of the cache is dirty. Thus, by tracking the coherence events on the coherence interconnect, cache lines instead of pages that are dirty can be tracked in the module.

Further embodiments include a device, such as a field programmable gate array (FPGA) for carrying out one or more aspects of the above method, and a system configured to carry out one or more aspects of the above method.

DETAILED DESCRIPTION

Figure 1:
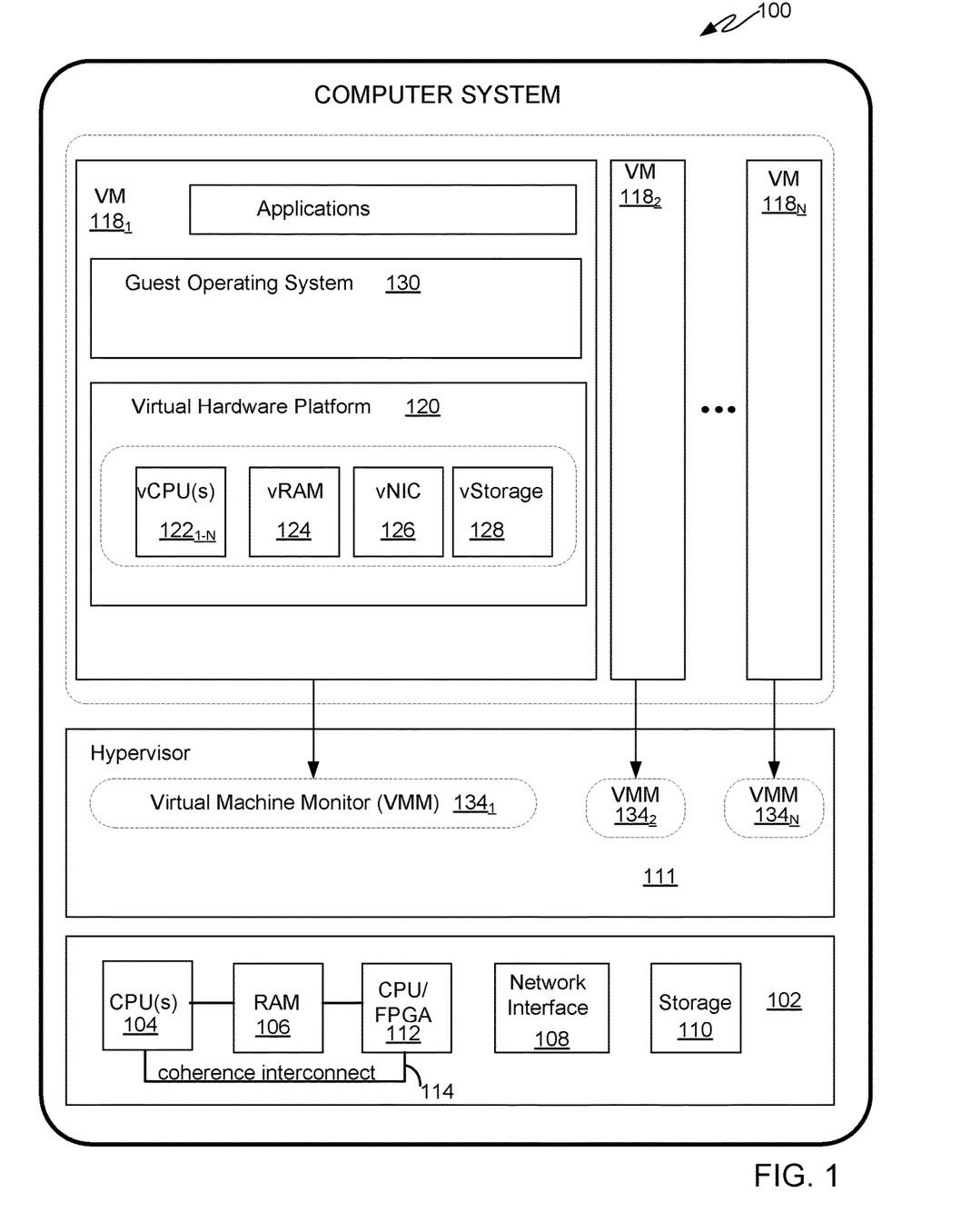
FIG. 1 depicts a block diagram of a computer system that is representative of a virtualized computer architecture in which embodiments may be implemented.

FIG. 1 depicts a block diagram of a computer system 100 that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as central processing units (CPUs) 104, a point-to-point coherence interconnect between processors, such as the Intel® UltraPath Interconnect (UPI), which is a successor to the Intel® QuickPath Interconnect (QPI), which supports a cache coherence protocol, a random access memory (RAM) 106, one or more network interfaces 108, and persistent storage 110. In the embodiment illustrated herein, another item of processing hardware, a field programmable gate array (FPGA) 112, is installed in one of the CPU sockets and communicates with one or more CPUs 104 via coherence interconnect 114. Though the following discussion has the FPGA occupy a CPU socket, the embodiments are not so limited; any arrangement of the FGPA that includes a connection to the coherence interconnect among processors present in computer system 100 is sufficient.

A virtualization software layer, referred to herein after as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, CA In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a physical computing machine platform that is executed under the control of hypervisor 111. Virtual devices of a VM 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, and the Linux® operating system, and the like.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 120 may be merged with and into VMM 134.

Figure 2A:
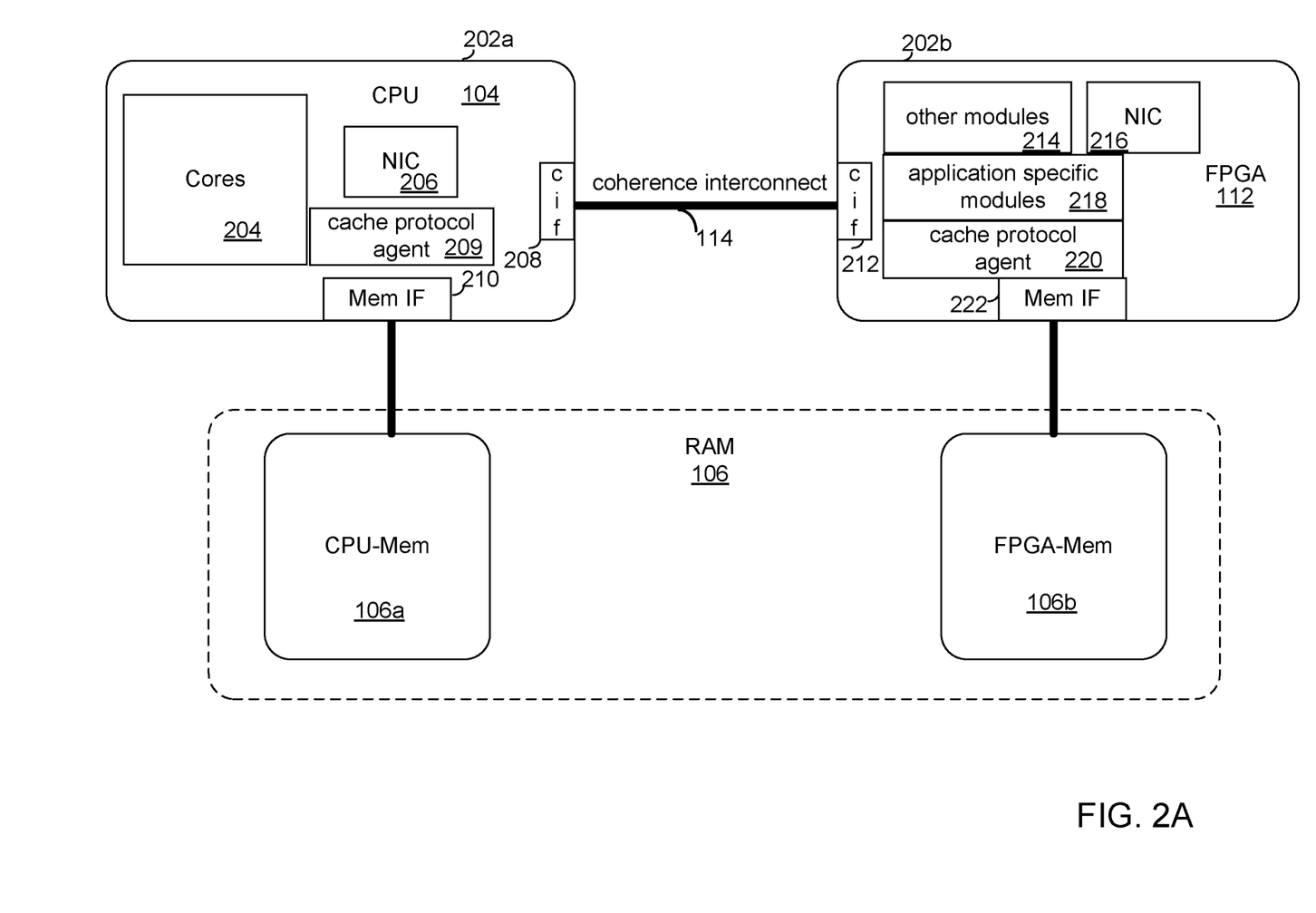
FIG. 2A depicts a block diagram of a pair of CPU sockets for CPUs in FIG. 1, in an embodiment.

FIG. 2A depicts a block diagram of a pair of CPU sockets, a first socket 202a for CPU 104 and a second socket 202b for FPGA 112. CPU 104 includes one or more processing cores 204, an interface 210 to CPU memory (CPU-Mem) 106a accessible by CPU 104, a network interface controller (NIC) 206, and a communications interface (cif) port 208 connected to coherence interconnect 114. FPGA 112 is configured with a network interface controller (NIC) 216, one or more application-specific modules 218, a cif port 212 and a cache protocol agent 220. Application specific modules 218 are configured by a bitstream representing custom programming of FPGA 112. Other modules 214 whose operations are unrelated to application-specific modules 218 may be present in FPGA 112, these modules and components being configured by a bitstream different from the custom programming bitstream. FPGA 112 has an interface 222 to its own memory, FPGA memory 106b (FPGA-Mem), which can be a restricted portion of RAM 106. In one embodiment, each CPU socket, 202a, 202b, represents a separate Non-Uniform Memory Access (NUMA) domain. The application or the VM is running on the CPU, located on the first socket 202a, while the FPGA is on the second socket 202b.

In one embodiment, the CPU 104 has a cache (not shown in FIG. 2A), which is used to reduce the average cost to access data from the memory. Data transferred between memory and cache in blocks of fixed size, called cache lines or cache blocks. When a cache line is copied from memory into the cache, a cache entry is created, which includes the copied data as well as the requested memory location (called a tag). When the CPU needs to read or write a location in the memory, it first checks for a corresponding entry in the cache. The cache checks for the contents of the requested memory location in any cache lines that might contain that address. If the processor finds that the memory location is in the cache, a cache hit has occurred; the CPU immediately reads or writes the data in the cache line. However, if the CPU does not find the memory location in the cache, a cache miss has occurred. For a cache miss, the cache allocates a new entry and copies data from main memory, then the request is fulfilled from the contents of the cache.

Cif ports 208, 212, mentioned above, support a coherence protocol, which is designed to maintain cache coherence in a system with many processors each having its own cache. With FPGA 112 residing in one socket 202b of the CPU sockets and having its own cif port 212, FPGA 112 can monitor and participate in the coherency protocol that keeps the processor caches coherent.

Cache coherence on coherence interconnect 114 is maintained according to a standard protocol, such as modified, exclusive, shared, invalid (MESI) protocol or modified, exclusive, shared, invalid, forwarded (MESIF) protocol. In these protocols, cache lines marked invalid signify that the cache line has invalid data and must be brought into the cache from memory accessible by the cache. Cache lines marked exclusive, shared and forwarded (in the MESIF protocol) all signify that the cache line has valid data, but the cache line is clean (not modified), so the cache line can be discarded without writing the cache line back the data to memory. A cache line marked as modified signifies one that holds a modified or dirty cache line, and must be written back to memory before the cache line is discarded from the cache.

To enforce the cache coherence protocol requires a cache protocol agent for each cache connected to a coherence interconnect. Each cache protocol agent can initiate and respond to transactions on the coherence interconnect by sending and receiving messages on the interconnect. In the present embodiments, CPU 104 has a cache protocol agent 209 and FPGA 112 has a cache protocol agent 220.

When a CPU accesses a cache line that is not in its cache, at any level of the cache hierarchy, cache protocol agent 209 of CPU 104 requests the cache line. Thus, cache protocol agent 209 in the CPU issues a load cache line transaction on coherence interconnect 114. This can be 'Load Shared' for sharing the cache line, or 'Load Exclusive' for cache lines that will be modified. A cache line that is loaded as 'Exclusive' is considered potentially dirty, because it is not certain the cache line will be modified. When the cache line gets evicted from the CPU hardware caches, if it is modified, it must be written back to the memory from which it originated. The operation of writing the cache line back is present on coherence interconnect 114 as a writeback transaction and can be monitored for tracking dirty cache lines. In the case of a writeback transaction, the cache line is actually dirty, rather than potentially dirty.

To confirm whether a cache line is dirty or not, a cache protocol agent, such as agent 220 in FPGA 112, can snoop the cache line in accordance with the coherence interconnect protocol. This causes a writeback transaction to be triggered, if the cache line is dirty.

Figure 2B:
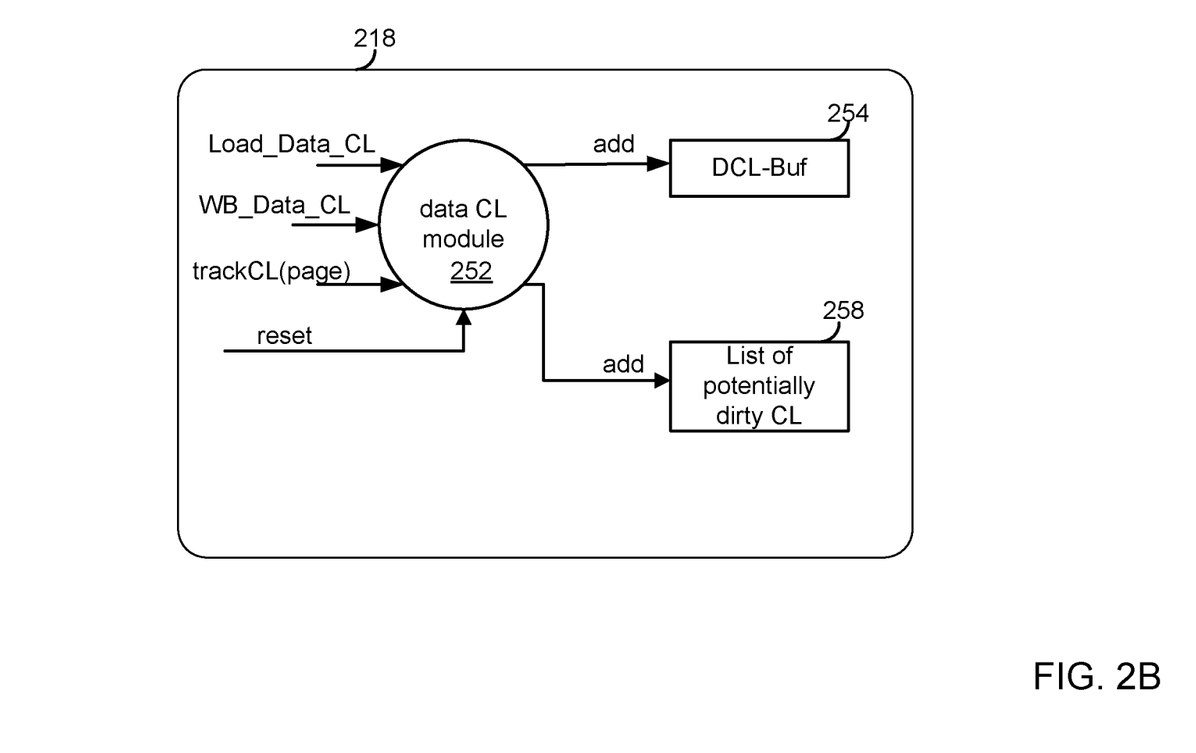
FIG. 2B depicts an embodiment of an application-specific module, which is the data CL module.

FIG. 2B depicts an embodiment in which application specific modules 218 in FPGA 112 include a data CL module 252 and a DCL-Buf 254, which receives a 'reset' message, a 'Load_Data_CL' message, a 'WB_Data_CL' message, and in some embodiments, a 'trackCL(page)' message and operates to track dirty cache lines and possibly potentially dirty cache lines. DCL-Buf 254 may be implemented in a number of ways. For example, the buffer can be implemented as a circular buffer of addresses to represent dirty cache lines, a bit map mapping the dirty cache lines of a page to represent the dirty cache lines in the page, an unbounded list or log of addresses representing dirty cache lines, a bounded list, a hash table or a tree. In the case of the unbounded list of addresses, the list can be sorted or unsorted. In the case of a hash table, each hash bucket can represent a page and can contain a sorted or unsorted list of cache lines belonging to the page and hash buckets can be merged or coalesced if entire pages are dirty. In the case of a tree, the neighbor nodes in the tree can represent spatial locality of the pages and neighbor nodes in the tree can be merged or coalesced if entire pages are dirty.

In some embodiments, application-specific modules 218 additionally include list 258 of potentially dirty cache lines.

Figure 2C:
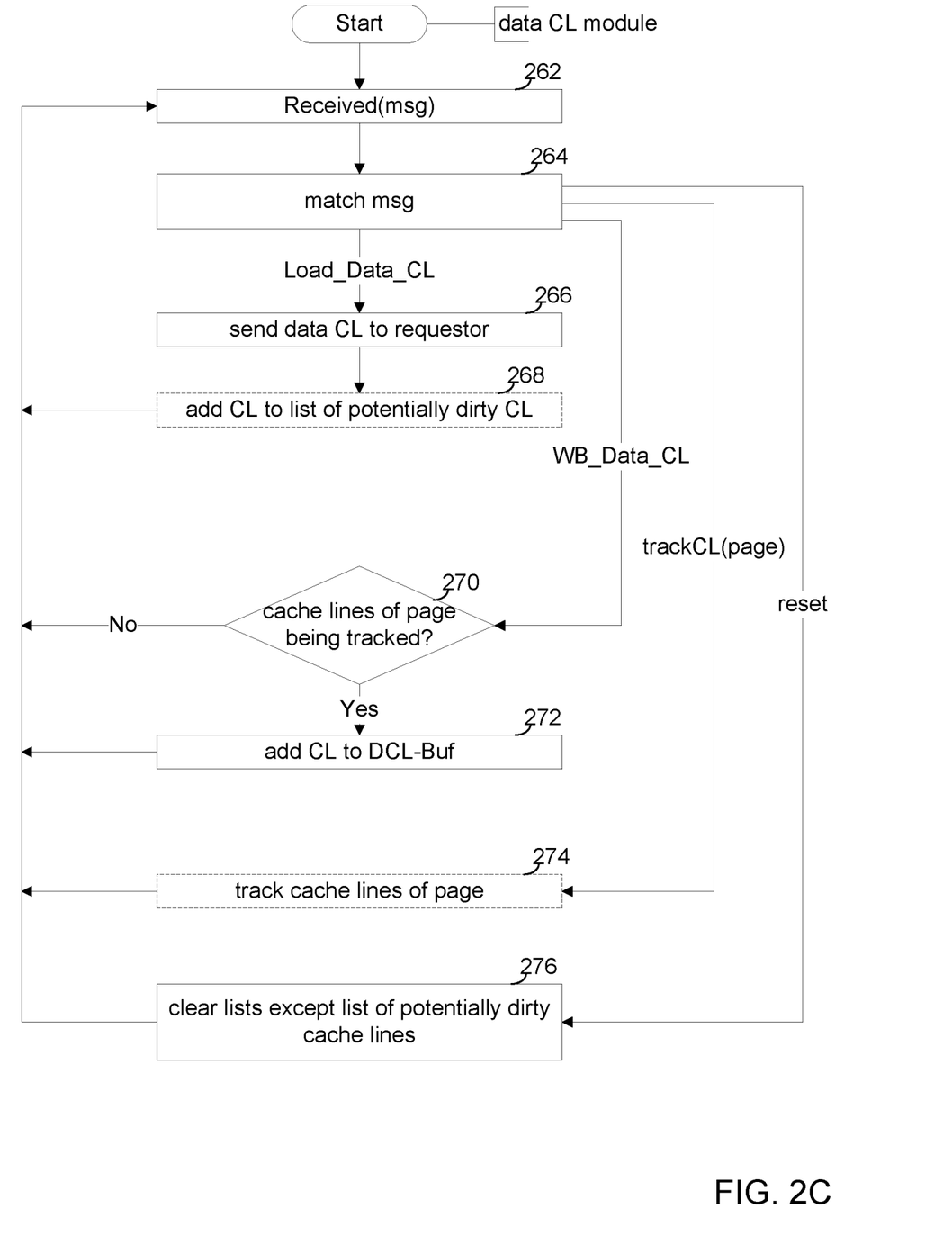
FIG. 2C depicts a flow chart for the data CL module, in an embodiment.

FIG. 2C depicts a flow diagram of the data CL module 252, in one embodiment. In step 262, module 252 receives a message. As used herein, in a step having the form of 'Received(msg)', such as step 262, 'Received(msg)' is a predicate, which, if true, is interpreted as signaling that an asynchronous message, msg, has been received. If no message has been received, the function or module is blocked waiting for a message to arrive. However, the function or module can test the predicate to avoid being blocked. In addition, embodiments described herein are not limited by any specific form or method of receiving messages. In step 264 module 252 matches the message to either a 'Load_Data_CL' message, a 'WB_Data_CL' message, which are messages that correspond to cache coherence events on coherence interconnect 114, or a reset message. The 'Load_Data_CL' message corresponds to a load cache event (i.e., transaction) on coherence interconnect 114 and the 'WB_Data_CL' message corresponds to a write back event (i.e., transaction) on coherence interconnect 114. Specifically, a 'Load_Data_CL' message occurs when a cache line (CL) in exclusive mode is loaded into a processor cache. A cache line loaded in exclusive mode indicates that the cache line may be modified. A 'WB_Data_CL' message occurs when the processor cache evicts and writes back a dirty cache line of a page to memory. Additionally, a 'WB_Data_CL' message can occur when a processor executes a store instruction, which bypasses the caches in the cache hierarchy. Such a store instruction is recognized by cache protocol agent 220 of FPGA 112. Module 252 handles the 'Load_Data_CL' message in step 266 by sending or enabling the sending of the requested cache line to the requestor. Module 252 handles the 'WB_Data_CL' message by determining in step 270 whether or not module 252 is tracking the cache lines of the page or not, based on a previously specified list of pages. If module is tracking the cache lines of the page, then in step 272 module 252 adds a representation of the cache line, such as an address or the setting of a bit in a bit map, to DCL-Buf 254. Otherwise, module 252 returns to step 262 to wait for a new message.

In some embodiments, module 252 receives a message in step 262 and matches the message in step 264 to a 'trackCL (page)' message. Module 252 handles this message by recording the page specified in the message in step 274. In this embodiment, when module determines in step 270 whether the cache lines of a page in which the cache line resides are being tracked, the module consults the list of tracked pages, each specified by a 'trackCL(page)' message.

In some embodiments, in handling a 'Load_Data_CL' message, module 252 adds, in step 268, the requested cache line to list 258 of potentially dirty lines. Having list 258 of potentially dirty cache lines enables module 252 to efficiently determine which cache lines in the list are actually dirty by snooping or flushing the cache lines in list 258.

In step 276, module handles a 'reset' message. In response to the 'reset' message, module 252 clears the information in DCL-Buf and any other internal lists, but not the list of potentially dirty cache lines. The clearing of the lists occurring say, at the beginning of a region of interest in an application, allows the module to exactly track a list of dirty or potentially dirty cache lines within that region.

Thus, operation module 252 allows use of dirty cache lines instead of dirty pages in applications involving modification of memory.

In one embodiment, the method may further include, based on the list of dirty cache lines, transferring dirty data associated with the dirty cache lines to another destination depending on the particular application. The application may be, e.g., a remote direct memory access, in which this step includes transferring dirty data associated with the dirty cache lines back to the remote memory. In another example, the application may be a live migration, in which a hypervisor needs to monitor dirty data in memory and copy it from a source host computer to a destination host computer. Thus, this step includes transferring dirty data associated with the dirty cache lines at the source host computer to the memory at the destination host computer.

Certain embodiments as describe above relate to a method to use a cache coherent FPGA to intercept cache coherence traffic in order to track modified cache lines. In one example, the system may involve a virtual machine running on Socket-0 and accessing data from a local memory accessible to the FPGA. Last Level Cache (LLC) misses from Socket-0 are transmitted over an UPI link to the memory controller responsible for FPGA-Mem on Socket-1. The memory controller then services the requests. Similarly, writebacks of modified cache lines from the LLC are also routed to the memory controller on Socket-1. The dirty data tracking logic on the FPGA interfaces with the memory controller to effectively intercept all LLC misses and writeback requests arriving at the memory controller and keeps track of the dirty cache-lines.

Certain embodiments as described above relate to a method to use a cache coherent FPGA to accelerate remote data transfer. The FPGA is a passive observer of the cache coherency protocol. However, it can also service data requests to memory located in a different host, effectively replacing page faults with cache misses for live migration and remote direct memory access. To do so, the FPGA exposes a larger address space than its local FPGA memory, by including addresses backed by memory in another host (e.g., a remote host). Moreover, the FPGA has to map the extended memory as present, so that CPU accesses do not cause page faults. Therefore, a VM access to a cache-line in the extended memory causes a cache miss and gets intercepted by the FPGA. The FPGA brings the cache-line over the network and responds to the CPU request. In one embodiment, there may be a fast network between the two hosts, with at most a few microseconds delay.

In addition to live migration and remote memory acceleration, this method for dirty data tracking as described above may be applied in other applications such as fault tolerance solution (FT), persistent memory logging, checkpointing and replication, processing in memory, tracing applications memory traffic, and offloading memory management tasks, etc.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for tracking dirtiness of data in memory, the method comprising:
monitoring cache coherence events, for a cache, occurring on a coherence interconnect that is connected to monitoring hardware comprising a memory and processing hardware, the processing hardware including the cache;
receiving, based on the monitoring, a write back transaction in which a modified cache line is written back from the cache to the memory;
determining, based on the write back transaction, that data in a page of the memory is dirty, wherein the data is of a fixed size corresponding to a size of a cache line of the cache;
adding, based on the write back transaction, a representation of the data to a buffer to indicate that the data in the page of the memory is dirty; and
based on determining that that the data in the page of the memory is dirty, copying the data in the page of the memory from a source computer to a destination computer without copying other data in the page that is different from the data of the fixed size corresponding to the size of the cache line.

2. The method of claim 1, wherein the processing hardware is a CPU.

3. The method of claim 1, wherein the buffer is implemented as a data structure selected from the group consisting of a circular buffer, a hash table, and a tree, and the representation of the cache line is an address stored in the data structure.

4. The method of claim 1, wherein monitored cache coherence events include a load of a cache line in an exclusive state into the cache.

5. The method of claim 1, wherein the write back transaction is triggered by a snoop of the cache of the processing hardware.

6. The method of claim 1, wherein a module tracks cache lines of one or more specified pages and an entry is added to the buffer if a dirty cache line is included in one of the specified pages.

7. A device comprising:
a coherence interconnect;
a buffer configured to hold representations of cache lines; and
a module coupled via the coherence interconnect to monitoring hardware comprising a memory and processing hardware, the processing hardware including a cache, wherein the module is configured to perform a method for tracking dirtiness of data in memory, the method comprising:
monitoring cache coherence events, for the cache, occurring on the coherence interconnect;
receiving, based on the monitoring, a write back transaction in which a modified cache line is written back from the cache to the memory;
determining, based on the write back transaction, that data in a page of the memory is dirty, wherein the data is of a fixed size corresponding to a size of a cache line of the cache;
adding, based on the write back transaction, a representation of the data to a buffer to indicate that the data in the page of the memory is dirty; and
based on determining that that the data in the page of the memory is dirty, copying the data in the page of the memory from a source computer to a destination computer without copying other data in the page that is different from the data of the fixed size corresponding to the size of the cache line.

8. The device of claim 7, wherein the processing hardware is a CPU.

9. The device of claim 7, wherein the buffer is implemented as a data structure selected from the group consisting of a circular buffer, a hash table, and a tree, and the representation of the cache line is an address stored in the data structure.

10. The device of claim 7, wherein cache coherence events include a load of a cache line in an exclusive state into the cache.

11. The device of claim 7, wherein the module tracks cache lines of one or more specified pages and an entry is added to the buffer if a dirty cache line is included in one of the specified pages.

12. A system comprising
a coherence interconnect;
monitoring hardware comprising a memory and processing hardware including a cache, the monitoring hardware being coupled to the coherence interconnect;
a buffer configured to hold representations of data; and
a device coupled to the coherence interconnect and to the buffer, wherein the device is configured to perform a method for tracking dirtiness of data in memory, the method comprising:

monitoring cache coherence events, for the cache, occurring on the coherence interconnect;

receiving, based on the monitoring, a write back transaction in which a modified cache line is written back from the cache to the memory;

determining, based on the write back transaction, that data in a page of the memory is dirty, wherein the data is of a fixed size corresponding to a size of a cache line of the cache;

adding, based on the write back transaction, a representation of the data to a buffer to indicate that the data in the page of the memory is dirty; and based on determining that that the data in the page of the memory is dirty, copying the data in the page of the memory from a source computer to a destination computer without copying other data in the page that is different from the data of the fixed size corresponding to the size of the cache line.

13. The system of claim 12, wherein the processing hardware is a CPU.

14. The system of claim 12, wherein the buffer is implemented as a data structure selected from the group consisting of a circular buffer, a hash table, and a tree, and the representation of the cache line is an address stored in the data structure.

15. The system of claim 12, wherein cache coherence events include a load of a cache line in an exclusive state into the cache.

16. The system of claim 12, wherein the write back transaction is triggered by a snoop of the cache of the processing hardware.

17. The system of claim 12, wherein a module tracks cache lines of one or more specified pages and an entry is added to the buffer if a dirty cache line is included in one of the specified pages.

* * * * *